United States Patent [19]

Weisfield et al.

[11] Patent Number: 4,779,107

[45] Date of Patent: Oct. 18, 1988

[54] MODULATION ELECTRODES HAVING IMPROVED CORROSION RESISTANCE

[76] Inventors: Richard L. Weisfield, 874 Cambridge Ave., Menlo Park, Calif. 94025; Leonard E. Fennell, 441 Alameda Ave., Half Moon Bay, Calif. 94019; Hsing C. Tuan, 1829 Channing Ave., Palo Alto, Calif. 94303

[21] Appl. No.: 135,818

[22] Filed: Dec. 21, 1987

[51] Int. Cl.[4] .............................................. G01D 15/00

[52] U.S. Cl. ..................................... 346/159; 346/155

[58] Field of Search ..................... 346/153.1, 155, 159, 346/75; 358/300; 101/DIG. 13; 400/119; 250/423 R

[56] References Cited

U.S. PATENT DOCUMENTS

| | | | |
|---|---|---|---|
| 4,646,163 | 2/1987 | Tuan et al. | 346/159 |
| 4,719,481 | 6/1988 | Tuan et al. | 346/159 |

*Primary Examiner*—Arthur G. Evans
*Attorney, Agent, or Firm*—Serge Abend

[57] ABSTRACT

A marking array for use in an ionographic marking apparatus in which the ion modulation structure is subject to a lighly corrosive atmosphere. Improved marking electrodes are provided which comprise a thin film body of a conductive material having a surface which is chemically neutral to the corona effluents.

20 Claims, 3 Drawing Sheets

MODULATION ELECTRODES HAVING IMPROVED CORROSION RESISTANCE

FIELD OF THE INVENTION

This invention relates to improvements in the marking array of an ionographic marking apparatus and, in particular, to improved modulation electrodes having extended lifetimes.

BACKGROUND OF THE INVENTION

In commonly assigned U.S. Pat. No. 4,584,592 issued on Apr. 22, 1986 in the names of Hsing C. Tuan and Malcolm J. Thompson entitled, "Marking Head For Fluid Jet Assisted Ion Projection Imaging Systems", there is disclosed a marking array for use in conjunction with the marking head of an ion projection printer of the type disclosed in commonly assigned U.S. Pat. No. 4,463,363 issued on July 31, 1984 in the names of Robert W. Gundlach and Richard L. Bergen, entitled, "Fluid Jet Assisted Ion Projection Printing". In that printer, an imaging charge is placed upon a moving receptor sheet, such as paper, by means of a linear array of closely spaced minute air streams. Charged particles, comprising ions of a single polarity (preferably positive), are generated in an ionization chamber of the marking head by a high voltage corona discharge and are then transported to and through the exit region of the marking head, where they are electrically controlled at each image pixel point, by an electrical potential applied to a modulating electrode. Selective control of the modulating electrodes in the array will enable spots of charge and absence of charge to be recorded on the receptor sheet for subsequent development.

A large area marking head for a page-width marking apparatus, such as a line printer or a copier, would typically measure about 8.5 inches wide. A high resolution marking array capable of printing 200 to 400 spots per inch would, therefore, include about 1700 to 3400 conductive metallic modulation electrodes. The entire array measuring on the order of 8.5 inches by 0.7 inches also would include a multiplexed addressing assembly comprising metallic address lines and data lines and amorphous silicon thin film active switching elements. All of these elements would be fabricated upon a single low cost substrate, such as glass.

During the operation of an ionographic marking apparatus, in addition to the ion flow from the corona source, there is also an outflow from the ionization chamber of gaseous material which is highly corrosive to the modulating electrodes and to any elements on the array which are not protected by suitable overcoating layers. Heretofore, the modulation electrodes have been fabricated of inexpensive electrically conductive materials which are compatible with standard thin film deposition techniques and which may be also used for conductive lines and for contacts with the active devices. Typically, this material has been aluminum. The ionization chamber effluents have a propensity to oxidize the exposed metallic modulation electrodes very rapidly, thereby lowering the operational lifetime of the marking array. It has been observed that the aluminum modulation electrodes oxidize continuously and rapidly, growing an insulating aluminum oxide layer which becomes increasingly unable to dissipate the ion charge built up thereon, so as to initially result in a deterioration of electrical modulation control characteristics, until finally, there will be a catastrophic electrical and mechanical failure as the electrodes are fully converted to the brittle insulating oxide which flakes off the substrate.

In two commonly assigned pending patent applications, there are disclosed ionographic marking heads having a resistance to corrosion, in this harsh ionographic environment, superior to that of the previously used aluminum electrodes. In U.S. Ser. No. 042,128 entitled "Modulation Electrodes Having Improved Corrosion Resistance" filed on Apr. 24, 1987 in the names of Nicholas K. Sheridon and Henry Sang, Jr. there is disclosed a marking head having modulation electrodes made of an aluminum and copper alloy which has an improved lifetime over unalloyed aluminum. It is believed that the improved lifetime arises from the copper "stuffing" the aluminum grain boundaries and preventing migration of oxygen through the material. This retards oxidization of the aluminum and slows its conversion to an insulating and embrittled material with the attendant deterioration of electrical and mechanical properties. In U.S. Ser. No. 042,131 entitled "Marking Array Having Improved Corrosion Resistance" filed on Apr. 24, 1987 in the names of Nicholas K. Sheridon and Henry Sang Jr. there is disclosed a marking head whose modulation electrodes are biased to a low level oxidation prevention potential, with similar beneficial results.

It is the primary object of the present invention to provide a marking array having an extended lifetime by incorporating modulation electrodes having surfaces substantially chemically neutral to the corrosive effluents of the ionographic process, so that the electrodes are not attacked and maintain their electrical and mechanical integrity.

Another object of the present invention is to provide modulation electrodes which will not build up an ion charge upon their surface.

Additionally, it is an object of this invention to provide modulation electrodes made of a materials which are inexpensive and which are compatible with the fabrication processes utilized in forming the marking head.

SUMMARY OF THE INVENTION

The present invention may be carried out, in one form, by providing an improved ion modulation structure for an ionographic marking apparatus through which corona effluents flow wherein the modulation structure comprises a marking array including a substrate upon which is integrally fabricated modulation electrodes, data buses, address buses and active thin film switches and wherein the modulation electrodes are formed of a thin film conductive base layer and an overlying protective surface layer which is chemically neutral to the corona effluents and which is sufficiently conductive to dissipate ion charges deposited upon its surface to the base material. The present invention may be carried out, in another form, by providing modulation electrodes formed of a thin film conductive layer bearing a thin oxide surface layer whose thickness is self limited, i.e. it will not consume the base layer over time, and wherein the oxide layer is chemically neutral to the corona effluents and which is sufficiently conductive to dissipate ion charges deposited upon its surface to the base material.

BRIEF DESCRIPTION OF THE DRAWINGS

Other objects and further features and advantages of this invention will be apparent from the following, more particular, description considered together with the accompanying drawings, wherein.

DETAILED DESCRIPTION OF THE PREFERRED EMBODIMENTS

Figure 1:
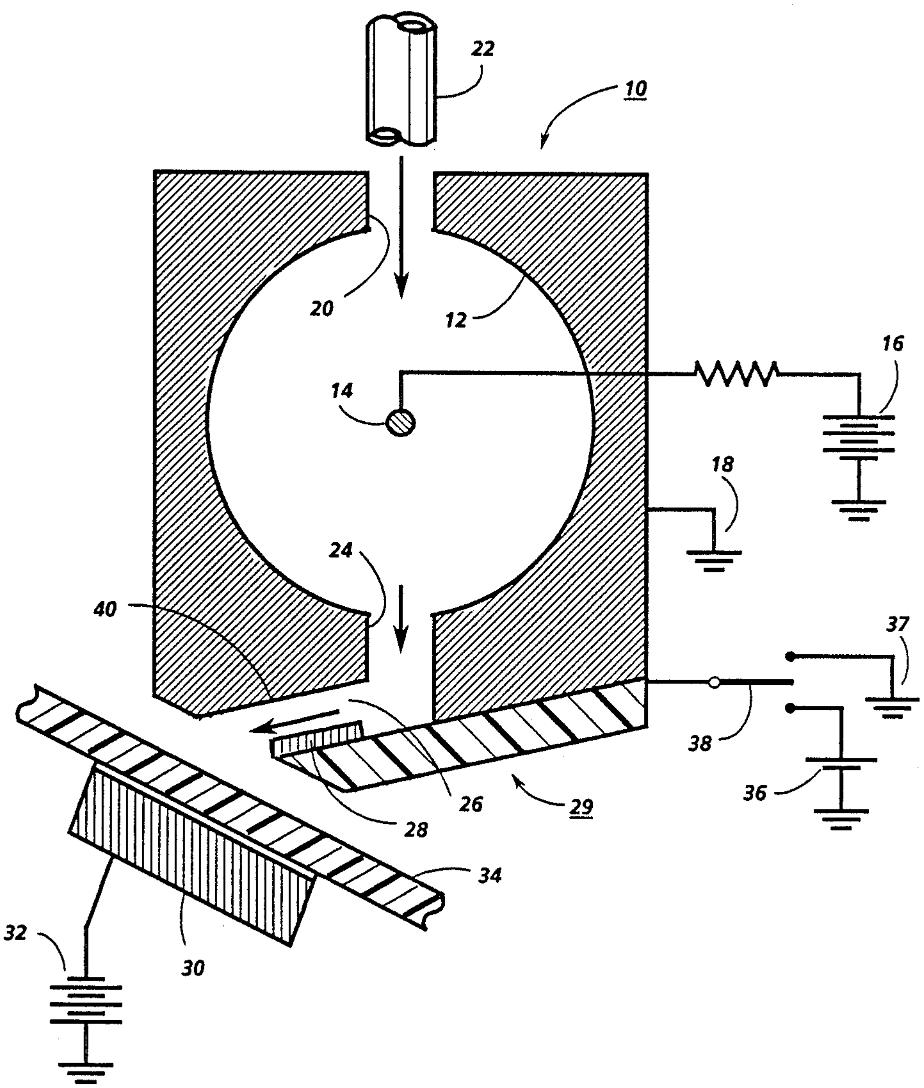
FIG. 1 is a partial cross-sectional elevation view showing the marking head of a fluid jet assisted ion projection printing apparatus.

With particular reference to the drawings, there is illustrated in FIG. 1 a schematic representation of the marking head 10 of a fluid jet assisted ionographic marking apparatus. Although a more representative embodiment of the present state of the marking head is described in commonly assigned U.S. Pat. No. 4,644,373 issued on Feb. 17, 1987, in the names of Nicholas K. Sheridon and Gerhard K. Sander, and entitled "Fluid Assisted Ion Projection Printing Head", the following description is based on the schematic FIG. 1 form.

Within the housing 10 is an ion generation region including an electrically conductive chamber 12, a corona wire 14 extending substantially coaxially in the chamber, a high potential source 16, on the order of several thousand volts DC, applied to the wire 14, and a reference potential source 18, such as ground, connected to the wall of chamber 12. The corona discharge around the wire creates a source of ions, of a given polarity (preferably positive), which are attracted to the grounded chamber wall and fill the chamber with a space charge.

An axially extending inlet channel 20 delivers pressurized transport fluid (preferably air) into the chamber 12 from a suitable source, schematically illustrated by the tube 22. An axially extending outlet channel 24 conducts the transport fluid from the corona chamber 12 to the exterior of the housing 10, past an ion modulation region 26. As the transport fluid passes through and exits the chamber 12, through outlet channel 24, it entrains a number of ions and moves them into the ion modulation region 26, past ion modulation electrodes 28, on the marking array 29.

We have found that in addition to the ions created by the corona discharge, within the chamber 12, there is also ozone, and numerous oxides of nitrogen ($N_2O$, $NO_2$, NO), as well as the excited states of these gases which are far more oxidizing than their non-activated states. In higher humidity conditions, where water is available, acids of nitrogen are also present. It is likely that the corrosive oxidizing action is caused by the combined effects of the ions and the gases. For example, it is believed that the gas molecules (i.e. ozone and nitrous oxide) initially blanket the surface of the electrodes, but it is not until the ions, moving in the air stream, collide with the surface and displace electrons therefrom that the surface is susceptible to react with the gases blanketed thereon. Then the electrode surface becomes rapidly oxidized. We have observed that in about 100 hours, a 1 to 2 micron thick aluminum electrode will have completely oxidized in this highly corrosive atmosphere. In that inordinately short time the insulating aluminum oxide will have grown to the complete thickness of the electrode and will have finally flaked off of the substrate due to the stresses created by its expansion. During its growth, the insulating effect blocks effective charge transfer and diminishes gray scale control.

Ions allowed to pass completely through and out of the housing 10, through the outlet channel 24, come under the influence of accelerating back electrode 30 which is connected to a high potential source 32, on the order of several thousand volts DC, of a sign opposite to that of the corona source 16. A charge receptor 34 moves over the back electrode 30 and collects the ions upon its surface. Subsequently the latent image charge pattern may be made visible by suitable development apparatus (not shown). Alternatively, a transfer system may be employed, wherein the charge pattern is applied to an insulating intermediate material, such as the dielectric surface of a conductive drum or belt. In such a case, the latent image charge pattern may be made visible by development upon the drum or belt surface and the developed image may subsequently be transferred to an image receptor sheet.

Once the ions have been swept into the outlet channel 24 by the transport fluid, it becomes necessary to render the ion-laden fluid stream intelligible. This is accomplished in the modulation region by individually switching the modulation electrodes 28, between a low voltage source 36 (on the order of ten to twenty volts DC) and a reference potential 37 (which may be ground) by means of a switch 38. The modulation electrode 28 and the grounded opposite wall 40, which bridge the gap across the outlet channel, comprise a capacitor, across which the low voltage potential of source 36, may be applied, when connected through switch 38. Thus, an electric field, extending in a direction transverse to the direction of the transport fluid flow, is selectively established between a given modulation electrode 28 and the grounded opposite wall 40.

"Writing" of a selected spot is accomplished by connecting a modulation electrode to the reference potential source 37, held at about 0 volts, so that the ion "beam", passing between the electrode and its opposite wall, will not be under the influence of a field therebetween and transport fluid exiting from the ion projector, in that "beam" zone, will carry the "writing" ions to accumulate on the desired spot of the image receptor sheet. Conversely, no "writing" will be effected when the modulation electric field is applied to an electrode. This is accomplished by connecting the modulation electrode 28 to the low voltage potential of source 36, on the order of about 10 to 20 volts, via the switch 38 so as to impose upon the electrode a charge of the same sign as the ionic species. The ion "beam" will be repelled and be driven into contact with the opposite, electrically grounded, conductive wall 40 where the ions recombine into uncharged, or neutral air molecules. Thus, an image-wise pattern of information is formed by selectively controlling each of the modulation electrodes on the marking array so that the ion "beams" associated therewith either exit or are inhibited from exiting the housing, as desired.

Figure 2:
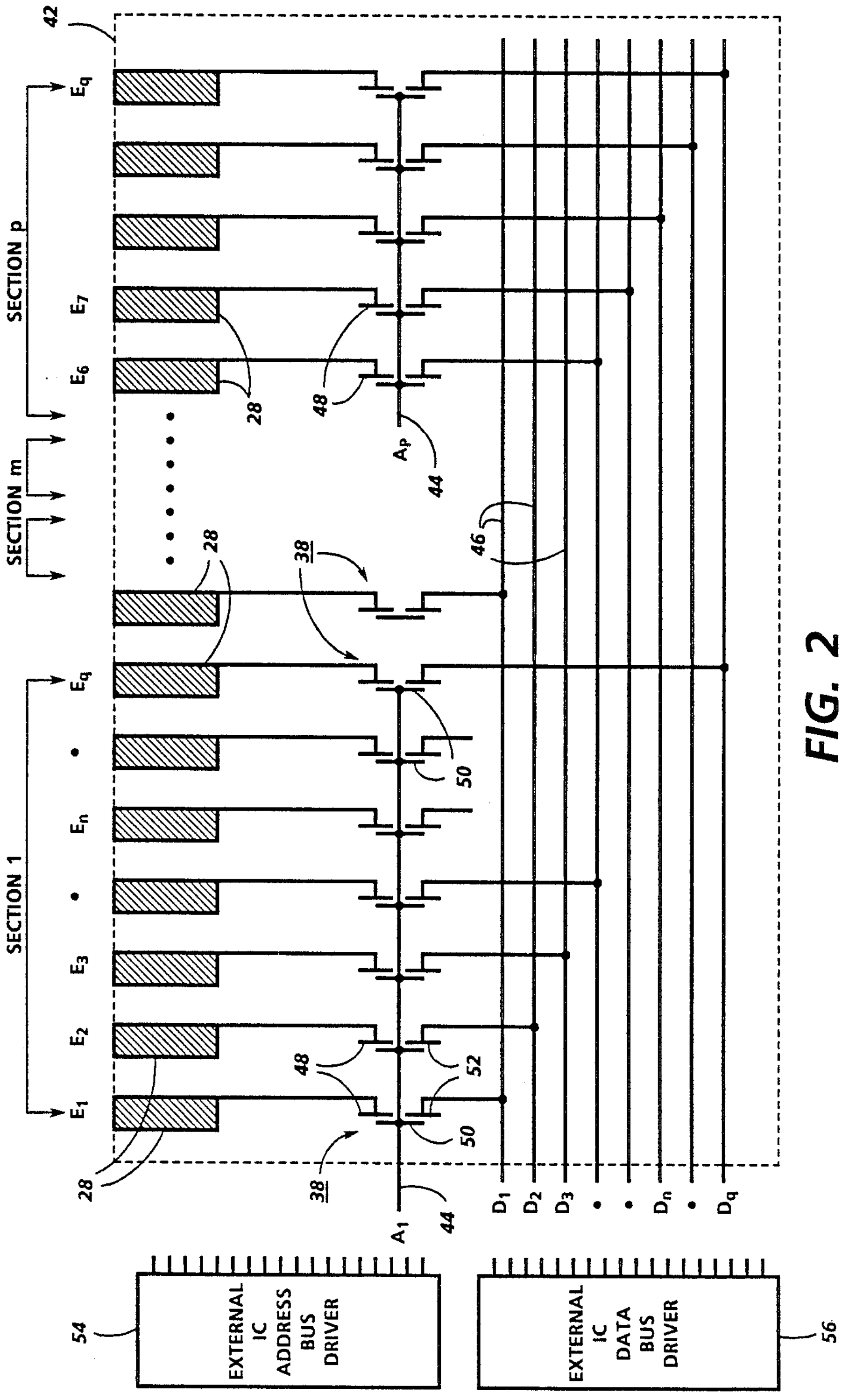
FIG. 2 is a schematic representation of the marking array used in the FIG. 1 device.

The marking array 29 comprises a large area substrate 42 (represented by the dotted outline in FIG. 2) along one edge of which are formed an array of modulation electrodes (E) 28, a multiplexed data entry or loading circuit, comprising a small number of address bus lines (A) 44 and data bus lines (D) 46, and thin film switching elements 38, one for each electrode. With this array it is possible to directly address each electrode with only the small number of wire bonds needed to interface the electrodes with the external driver circuits 54 and 56.

For simplicity and economy of fabrication over the large area, full page-width head, thin film techniques are used. Thin film silicon, in either the amorphous, polycrystalline or microcrystalline forms, has been the material of choice for the active devices. More particularly, we have had success with switches 38 being amorphous silicon transistors (a-Si:H TFTs). As shown, each modulation electrode 28 is connected to the drain electrode 48 of the thin film transistor by a conductive trace, an address bus line 44 is connected to the gate electrode 50, and a data bus line 46 is connected to the source electrode 52. The relatively low temperature of the amorphous silicon and polysilicon fabrication processes allows a large degree of freedom in the choice of substrate materials, enabling the use of inexpensive amorphous materials such as glass, ceramics and possibly some printed circuit board materials. Preferably, the substrate is glass and the conductive lines (address and data buses) are aluminum. We have chosen aluminum because it is inexpensive, compatible with this type of processing, and makes good contacts with the source, drain and gate electrodes.

Heretofore, the conductive modulation electrodes have also been made of aluminum. However, the aluminum modulation electrodes have been found to oxidize rapidly when used in the ionographic process because they are subjected to the highly oxidizing effluents from the corona chamber 12. Since the other aluminum elements are protected with suitable passivating layers and are, therefore, not contacted by these corrosive effluents, they are unaffected. Short of the catastrophic mechanical failure brought about by the complete oxidation of the aluminum modulation electrodes we have also observed a fall-off in gray scale control as oxidation progresses. This phenomenon occurs as an insulating layer of aluminum oxide is built up on the electrodes. As the thickness of the insulating layer and its resistance through the film increases, the ion charge will not be conducted through the oxide layer to the conductive aluminum electrode below and charge accumulates thereon. Thus, the net effect of the switching potential imposed on the electrodes is lessened by the surface charge and the accurate control needed for multiple levels of gray is subverted.

The modulation electrodes of the present invention should comprise a material or a combination of materials which will be conductive enough to allow the modulation voltage to be supported virtually intact along the length of the entire electrode and which has a surface layer that is both substantially chemically neutral to the corrosive corona effluents and has a resistance such that ion charges may be readily conducted through the film to the underlying body of the electrode. This is to be distinguished from the invention of copending application U.S. Ser. No. 042,128 (discussed supra) wherein the material of the electrode (an aluminum and copper alloy) is selected to be oxidized considerably more slowly than the prior pure aluminum electrodes. Of course, the electrode materials selected should be compatible with the thin film marking head fabrication process. Inert materials, such as the noble metals, gold or platinum, have experimentally yielded extremely corrosion resistant electrodes because they are impervious to oxidation and etching by the corona effluents. However, their cost and non-compatibility with the marking head fabrication process have negated their practical use. If a practical plating method were devised for the use of these materials, they may be attractive candidates. Other materials, which we believe to be appropriate, are conductive oxides, such as ITO (indium tin oxide) or tin oxide, conductive nitrides, cermets (such as Cr in $SiO_2$ or Al in $Al_2O_3$), or bulk silicides. These are expected to fare well in the harsh corona environment, but may not be practically compatible with our integrated head fabrication processes.

We have been particularly successful with two forms of the modulation electrode material which have the desired electrical and mechanical properties in this harsh environment and which are inherently compatible with the head fabrication processes. These are based upon conductive, doped silicon. In our process we use n+doped sources and drains in our TFTs, therefore, to deposit modulation electrodes of n+silicon simultaneously with the TFTs would be relatively simple and virtually cost-free. Of course, if p+doped silicon is used in the TFTs, the modulation electrodes could be made of that material as well. One form of our invention relies upon the fact that the conductive doped silicon grows a native oxide to a self limited thickness (FIG. 3), which surface is substantially inert to the corona effluents. In another form of our invention, a thin silicide layer is grown on the conductive doped silicon electrode surface (FIG. 4). In each case there is provided a tough surface layer which is impervious to most acids and which resists further growth and is sufficiently conductive, so as not to affect gray scale writing.

Figure 3:
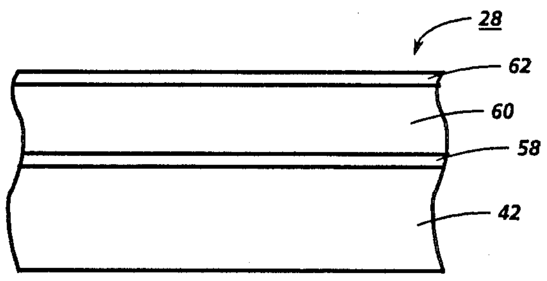
FIG. 3 is a partial cross-sectional view of one form of the modulation electrode of this invention.
Figure 4:
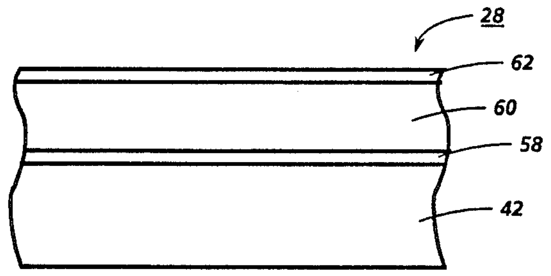
FIG. 4 is a partial cross-sectional view of another form of the modulation electrode of this invention.

The modulation electrode illustrated in FIG. 3 comprises a number of thin film layers supported upon the substrate 42. The first layer is a thin conductive underlying electrode 58, preferably made of chromium. The conductive thin film is initially deposited upon the substrate and is then patterned into electrode configuration as well as into TFT gates (not shown). Subsequently, in the process of marking head fabrication, a thin film layer of n+silicon (which could be of amorphous, polycrystalline or microcrystalline form) is deposited and is then patterned into the modulation electrodes 60, upon underlying electrodes 58, as well as into TFT contacts and resistors (also not shown). A thin, insulating, native silicon dioxide layer 62 will grow upon the exposed n+modulation electrode surface to a maximum thickness of about 10 to 20 Å at the relatively low temperatures to which the marking array is subjected. With silicon, as opposed to aluminum, the oxide growth kinetics is not conductive to the formation of a thick layer. Although the resistivity of the $SiO_2$ layer is higher than that of the conductive silicon, its thickness does not increase to the point where the overall resistance of the protective layer adversely affects its ability to dissipate the ion charge vertically therethrough, to the base layer 60.

The n+base layer 60 is sufficiently conductive in the direction along the modulation electrode fingers to allow the modulation voltage to flow virtually intact over the entire length of the electrodes in the time frame required for a practical printer. By depositing the n+over a metallic underlying electrode 58, such as chromium, higher conductivity and redundancy is provided in the event of breaks in the n+layer. The tough, native oxide layer 62 which forms on the n+is impervious to most acids and to the extremely corrosive corona atmosphere to which it is subjected within the marking head. Our expectation of an extended lifetime has been preliminarily confirmed by life tests of about 1000 hours after which the electrodes were found to be intact and operational.

The modulation structure illustrated in FIG. 4 is similar to that of the FIG. 3 embodiment. It also includes conductive, chromium underlying electrodes 58′ and overlying n+modulation electrodes 60′. The difference resides in the surface layer 64 which is deposited thereon. We have used a transistion metal silicide which has been found to be even more resistant to attack by the corrosive corona effluents than is the inherent silicon dioxide surface layer of FIG. 3. It is well known that silicides are quite chemically inert and are tough to etch. These are desirable characteristics for use in the present harsh environment where they resist oxidation and etching. Because of the compatibilty of chromium with our process (i.e. it is used elsewhere in the marking array) we have provided a chrome silicide surface layer 64. It should be understood that other transition metal silicides, such as those formed from the interaction between the n+silicon and molybdenum, nickel, platinum or palladium, could also be used.

Immediately prior to silicidation of the patterned n+layer, the array should be treated to remove any native oxide, such as by dipping it into HF or other suitable bath. Then a thin chromium layer is deposited upon the n+ layer as by sputtering, evaporation or other known method, so as to enable a solid state reaction, between these layers, to form a chrome silicide layer. Sputtering supplies enough energy to promote an initial chemical reaction at the interface, thereby immediately forming a thin silicide layer. The thickness of the layer is enhanced by annealing, which we have done at 200° C. (a uniquely low silicide formation temperature) for thirty minutes, to form a 50 Å silicide layer. If the chromium layer is deposited by the lower energy evaporation process, the annealing step is required both to initiate and to complete silicide growth. After the desired growth has been achieved, the remainder of the surface chromium layer, including that portion deposited between the electrodes, is removed with a suitable etchant which stops at the silicide and at the glass substrate. As an alternative to the silicide protective layer, we also contemplate the formation of a silicon nitride protective layer.

Figure 5:
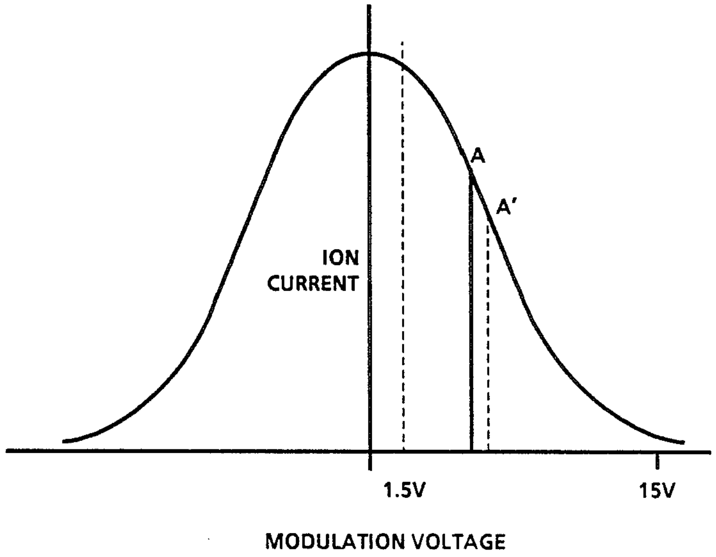
FIG. 5 is a transconductance curve for the modulation electrodes.

Referring to the transconductance curve of FIG. 5 it can be seen that there is a bell-shaped profile to the relationship between the voltage imposed upon the modulation electrodes and the ion output current of the marking apparatus. At very small and very large modulation voltages (the peak and the tail of the curve) the ion current will be ON and OFF, respectively, over a larger latitude of modulation voltage levels, owing to the relative flatness of these regions of the curve. This enables a greater latitude for binary "writing" (ON or OFF, black or white). In the steeply curved portions, smaller variations in the modulation voltage will have a greater effect on the ion output current. It is in these sections of the curve that multiple levels of gray may "written". Application of different potential values to the modulation electrodes enables control of the ion output in proportion to applied potential. Therefore, it should be recognized that gray scale printing is dependent upon accurate control of the voltage applied to each electrode, for each desired gray value.

It should be noted that if the resistance of the surface layer increases, because of its growth, ions passing through the modulation region will tend to accumulate thereon. Such an accumulated bias does not dissipate rapidly, and will adversely affect accurate control of the desired "writing" bias. The actual charge seen by the ions passing through the modulation region 26 will be the sum of the applied charge (desired) and the accumulated charge (residual). Looking at the transconductance curve of FIG. 5, if it is desired to "write" a gray level A with a given electrode, and that electrode had previously been "writing" black or a darker level of gray, during which more ions flowed through the modulation region, there would normally have been some ion accumulation upon the modulation electrodes, resulting in the gray level A′ being "written". Those modulation electrodes of our invention which require a protective surface layer (as opposed to those whose bulk material is substantially chemically inert to the corona effluents) will have a surface layer which is of virtually invariable thickness and a resistivity such that any ion charge build-up thereon may be conducted through the thickness of the layer to the underlying conductive electrode material.

In summary, we have provided an improvement in the modulation structure of the marking head of an ionographic marking apparatus for increasing the effective lifetime of the modulation electrodes in the highly corrosive oxidizing atmosphere of such a device. Additionally, the electrical response characteristics of the novel electrodes are stable, thus enabling the potential applied to them to be accurately controlled and improving gray scale control.

It should be understood that the present disclosure has been made only by way of example, and that numerous changes may be resorted to without departing from the true spirit and scope of the invention as hereinafter claimed.

What is claimed:

1. A marking array for use with an ionographic marking apparatus through which corrosive corona effluents flow, said marking array comprising an electrically insulating substrate upon which is integrally formed active semiconductor devices, marking electrodes and electrically conductive lines for interconnecting input signals to said marking electrodes via said active semiconductor devices, the improvement characterized in that each of said marking electrodes comprises a thin film conductive base layer overcoated with a protective surface layer which is chemically neutral to said corona effluents and which is sufficiently conductive to dissipate ion charges deposited upon its exposed surface, through its thickness to said underlying base material.

2. A marking array for use with an ionographic marking apparatus through which corrosive corona effluents flow, said marking array comprising an electrically insulating substrate upon which is integrally formed active semiconductor devices, marking electrodes and electrically conductive lines for interconnecting input signals to said marking electrodes via said active semiconductor devices, the improvement characterized in that each of said marking electrodes comprises a thin film conductive base layer bearing thereon an oxide protective surface layer of self limiting thickness which is chemically neutral to said corona effluents and which is sufficiently conductive to dissipate ion charges deposited upon its exposed surface, through its thickness to said underlying base material.

3. The marking array as defined in either claim 1 or claim 2 characterized in that said conductive base layer comprises a conductively doped thin film semiconductor material.

4. The marking array as recited in claim 3 characterized in that said semiconductor material comprises silicon.

5. The marking array as recited in claim 4 characterized in that said conductive doped semiconductor electrodes are in the amorphous form.

6. The marking array as recited in claim 4 characterized in that said conductive doped semiconductor electrodes are in the polycrystalline form.

7. The marking array as recited in claim 4 characterized in that said conductive doped semiconductor electrodes are in the microcrystalline form.

8. The marking array as recited in claim 1 characterized in that said thin film conductive base layer is doped silicon and said protective surface layer is a silicide.

9. The marking array as recited in claim 8 characterized in that said silicide layer is a transition metal silicide.

10. The marking array as recited in claim 8 characterized in that said silicide layer is chrome silicide.

11. The marking array as recited in any of claim 1 characterized in that said thin film conductive base layer is doped silicon and said protective surface layer is a nitride.

12. A marking array for use with an ionographic marking apparatus through which corona effluents flow, said marking array comprising an electrically insulating substrate upon which is integrally formed active semiconductor devices, marking electrodes and electrically conductive lines for interconnecting input signals to said marking electrodes via said active semiconductor devices, the improvement characterized in that said marking electrodes are formed of a thin film conductive oxide whose surface is chemically neutral to said corona effluents.

13. The marking array as recited in claim 12 characterized in that said oxide is ITO.

14. The marking array as recited in claim 12 characterized in that said oxide is tin oxide.

15. A marking array for use with an ionographic marking apparatus through which corona effluents flow, said marking array comprising an electrically insulating substrate upon which is integrally formed active semiconductor devices, marking electrodes and electrically conductive lines for interconnecting input signals to said marking electrodes via said active semiconductor devices, the improvement characterized in that said marking electrodes are formed of a thin film conductive nitride whose surface is chemically neutral to said corona effluents.

16. The marking array as recited in claim 15 characterized in that said nitride is titanium nitride.

17. A marking array for use with an ionographic marking apparatus through which corona effluents flow, said marking array comprising an electrically insulating substrate upon which is integrally formed active semiconductor devices, marking electrodes and electrically conductive lines for interconnecting input signals to said marking electrodes via said active semiconductor devices, the improvement characterized in that said marking electrodes are formed of a cermet whose surface is chemically neutral to said corona effluents.

18. The marking array as recited in claim 17 characterized in that said cermet comprises chromium particles in a silicon dioxide matrix.

19. The marking array as recited in claim 17 characterized in that said cermet comprises aluminum particles in an aluminum oxide matrix.

20. A marking array for use with an ionographic marking apparatus through which corona effluents flow, said marking array comprising an electrically insulating substrate upon which is integrally formed active semiconductor devices, marking electrodes and electrically conductive lines for interconnecting input signals to said marking electrodes via said active semiconductor devices, the improvement characterized in that said marking electrodes are formed of a bulk silicide whose surface is chemically neutral to said corona effluents.

* * * * *

UNITED STATES PATENT AND TRADEMARK OFFICE
CERTIFICATE OF CORRECTION

PATENT NO. : 4,779,107

DATED : October 18, 1988

INVENTOR(S) : Richard L. Weisfield et al

It is certified that error appears in the above--identified patent and that said Letters Patent is hereby corrected as shown below:

On the Title Page, Item No. 73 should appear as follows:

"Assignee: Xerox Corporation,
Stamford, Conn."

Signed and Sealed this

Eleventh Day of April, 1989

*Attest:*

DONALD J. QUIGG

*Attesting Officer* *Commissioner of Patents and Trademarks*